US012634899B2

(12) United States Patent
Ye et al.

(10) Patent No.: US 12,634,899 B2
(45) Date of Patent: May 19, 2026

(54) TRANSPORT BLOCK OVER MULTIPLE SLOTS FOR DOWNLINK TRANSMISSIONS

(71) Applicant: Apple Inc., Cupertino, CA (US)

(72) Inventors: Chunxuan Ye, San Diego, CA (US); Dawei Zhang, Saratoga, CA (US); Wei Zeng, Saratoga, CA (US); Hong He, San Jose, CA (US); Jie Cui, San Jose, CA (US); Weidong Yang, San Diego, CA (US); Chunhai Yao, Beijing (CN); Sigen Ye, San Diego, CA (US); Pavan Nuggehalli, San Carlos, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 18/129,658

(22) Filed: Mar. 31, 2023

(65) Prior Publication Data

US 2023/0345431 A1 Oct. 26, 2023

Related U.S. Application Data

(60) Provisional application No. 63/334,922, filed on Apr. 26, 2022.

(51) Int. Cl.
H04W 72/04 (2023.01)
H04L 5/00 (2006.01)
(Continued)

(52) U.S. Cl.
CPC ....... H04W 72/0446 (2013.01); H04L 5/0064 (2013.01); H04W 72/1273 (2013.01); H04W 72/232 (2023.01)

(58) Field of Classification Search
CPC ........... H04W 72/232; H04W 72/0446; H04W 72/1273; H04W 72/1289; H04W 72/23; H04W 72/004; H04L 5/0064; H04L 5/006
See application file for complete search history.

(56) References Cited

U.S. PATENT DOCUMENTS

2015/0208392 A1 7/2015 Park et al.
2019/0174466 A1* 6/2019 Zhang .................. H04L 5/0057
(Continued)

FOREIGN PATENT DOCUMENTS

EP 2 087 633 B1 9/2010
WO WO 2021/168777 A1 9/2021

OTHER PUBLICATIONS

International Search Report and Written Opinion for Application No. PCT/US2023/019853 mailed Aug. 18, 2023, 11 pages.
(Continued)

*Primary Examiner* — Wei Zhao
(74) *Attorney, Agent, or Firm* — Sterne, Kessler, Goldstein & Fox P.L.L.C.

(57) ABSTRACT

Mechanisms are provided for a user equipment (UE) to receive physical downlink shared channel (PDSCH) transmissions of a transport block (TB) over multiple slots. The UE can receive a configuration for a PDSCH transmission of a TB over multiple slots (TBoMS), such as a first number of slots, through a downlink from a base station. The configuration can include an indication of the first number of slots. The UE can further determine a transport block size (TBS) for the PDSCH transmission, and allocate a second number of slots used by the UE to support the PDSCH transmission. Based on the TBS for the PDSCH transmission satisfying a condition, the processor can be configured to receive the PDSCH transmission of the TB over the second number of slots, and decode the PDSCH transmission received.

20 Claims, 7 Drawing Sheets

(51) Int. Cl.
  *H04W 72/0446*    (2023.01)
  *H04W 72/1273*    (2023.01)
  *H04W 72/232*     (2023.01)

(56)       References Cited

U.S. PATENT DOCUMENTS

| | | | |
|---|---|---|---|
| 2021/0274530 A1 | 9/2021 | Sebire et al. | |
| 2022/0346104 A1* | 10/2022 | Yi | H04W 72/56 |
| 2023/0092206 A1* | 3/2023 | Bae | H04W 72/23 |
| | | | 370/329 |

OTHER PUBLICATIONS

3GPP TS 38.213 V17.0.0 (Dec. 2021), 3rd Generation Partnership Project; Technical Specification Group Radio Access Network; NR; Physical layer procedures for control (Release 17); 225 pages.
3GPP TS 38.214 V15.16.0 (Mar. 2022), 3rd Generation Partnership Project; Technical Specification Group Radio Access Network; NR; Physical layer procedures for data (Release 15); 107 pages.
3GPP TR 38.830 V17.0.0 (Dec. 2020), 3rd Generation Partnership Project; Technical Specification Group Radio Access Network; Study on NR coverage enhancements (Release 17); 91 pages.

\* cited by examiner

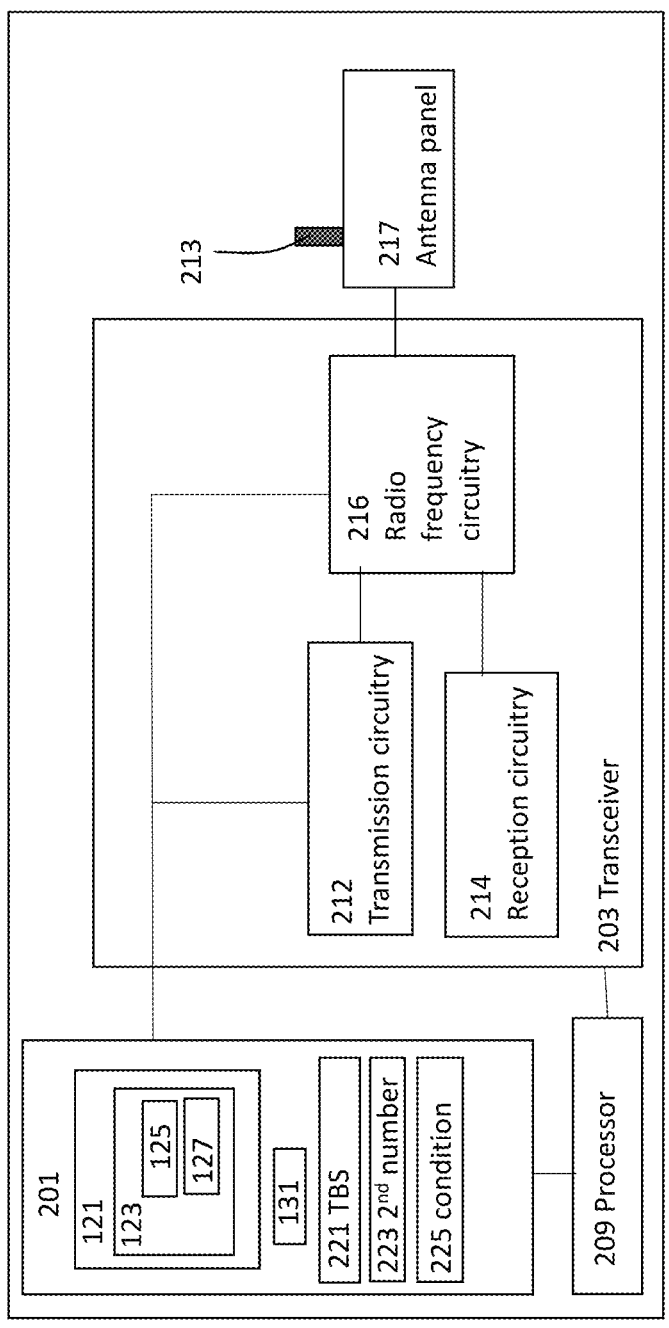
FIG. 2

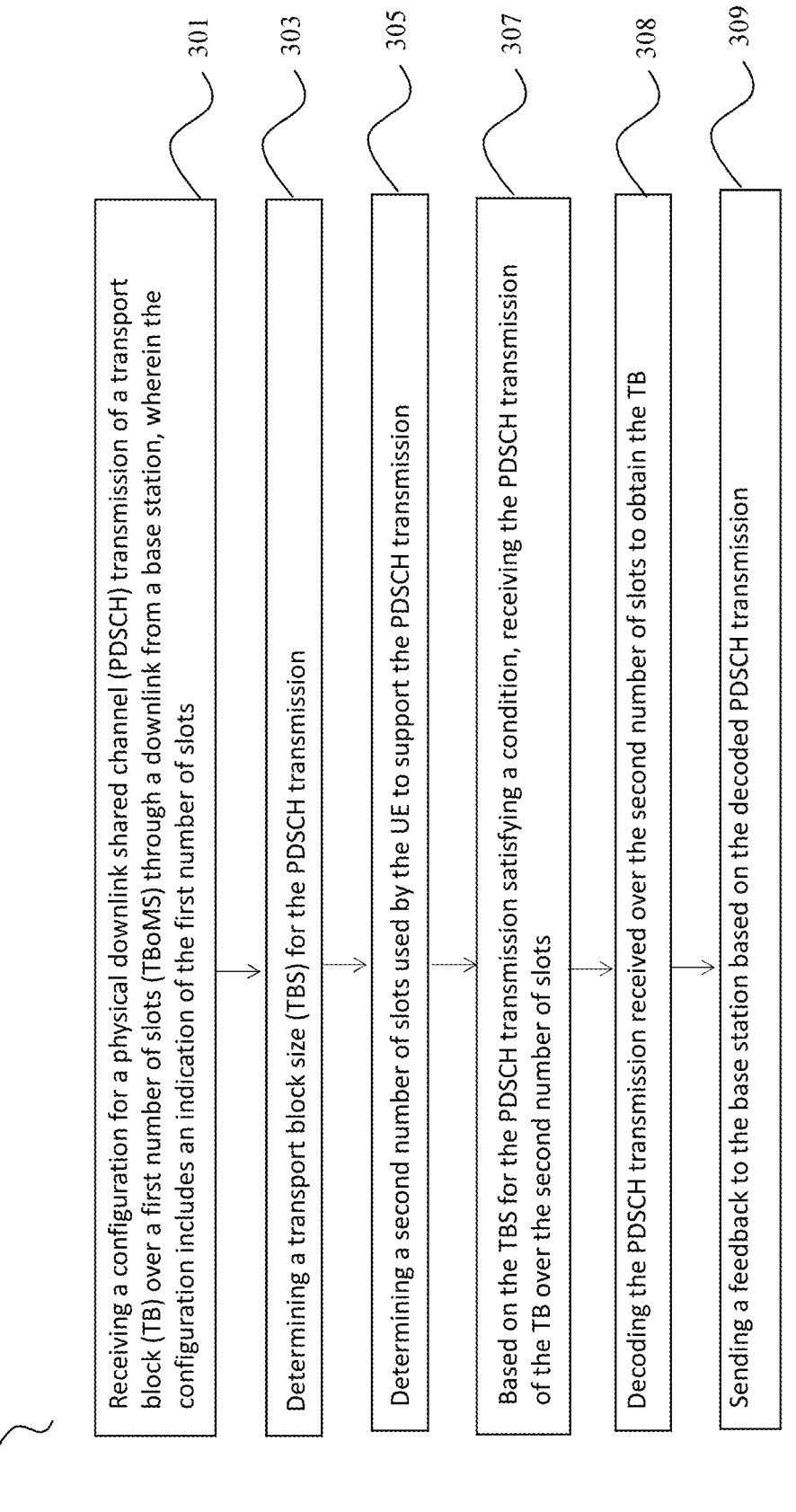

301 Receiving a configuration for a physical downlink shared channel (PDSCH) transmission of a transport block (TB) over a first number of slots (TBoMS) through a downlink from a base station, wherein the configuration includes an indication of the first number of slots 303 Determining a transport block size (TBS) for the PDSCH transmission 305 Determining a second number of slots used by the UE to support the PDSCH transmission 307 Based on the TBS for the PDSCH transmission satisfying a condition, receiving the PDSCH transmission of the TB over the second number of slots 308 Decoding the PDSCH transmission received over the second number of slots to obtain the TB 309 Sending a feedback to the base station based on the decoded PDSCH transmission

Receiving a configuration for a physical downlink shared channel (PDSCH) transmission of a transport block (TB) over multiple slots — 401

Receiving a DCI for scheduling downlink data transmission with TB over multiple slots — 403

Receiving and decoding the PDSCH transmissions over multiple slots — 405

Sending a HARQ feedback to the base station for the PDSCH transmission — 407

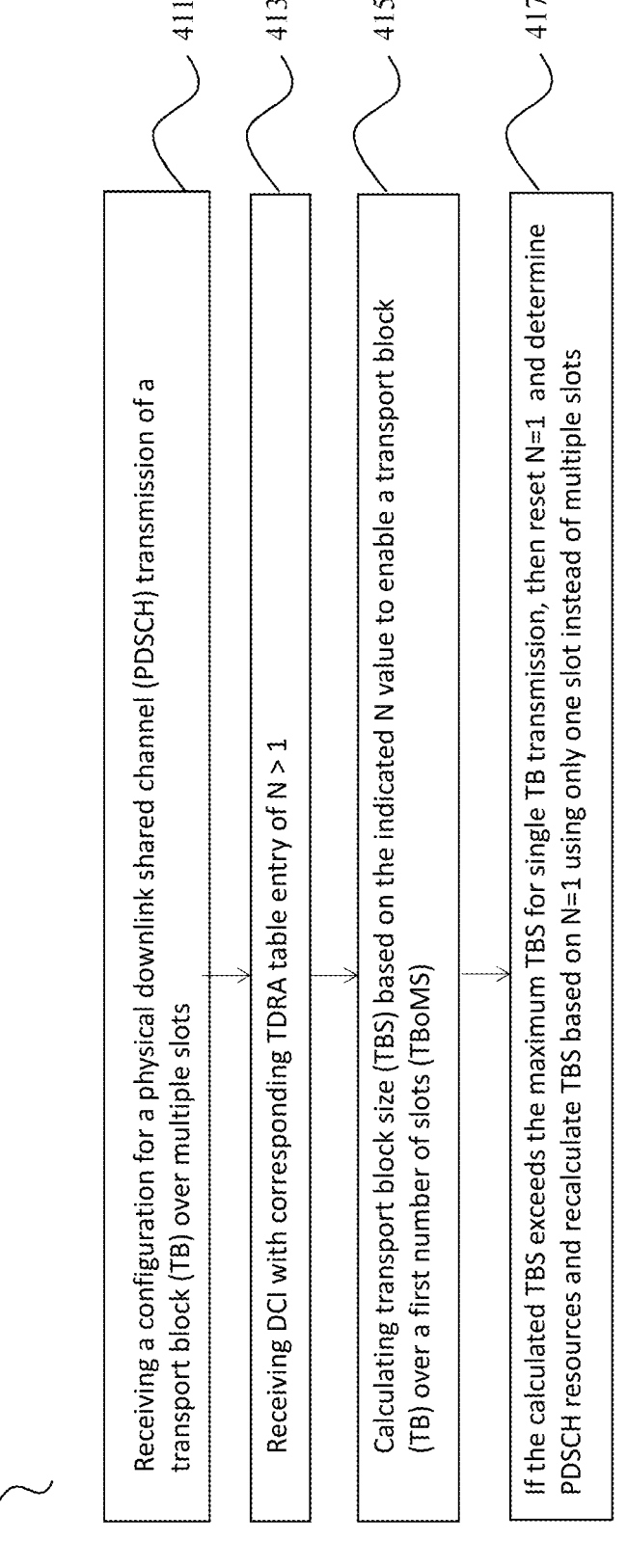

411

Receiving a configuration for a physical downlink shared channel (PDSCH) transmission of a transport block (TB) over multiple slots

413

Receiving DCI with corresponding TDRA table entry of N > 1

415

Calculating transport block size (TBS) based on the indicated N value to enable a transport block (TB) over a first number of slots (TBoMS)

417

If the calculated TBS exceeds the maximum TBS for single TB transmission, then reset N=1 and determine PDSCH resources and recalculate TBS based on N=1 using only one slot instead of multiple slots

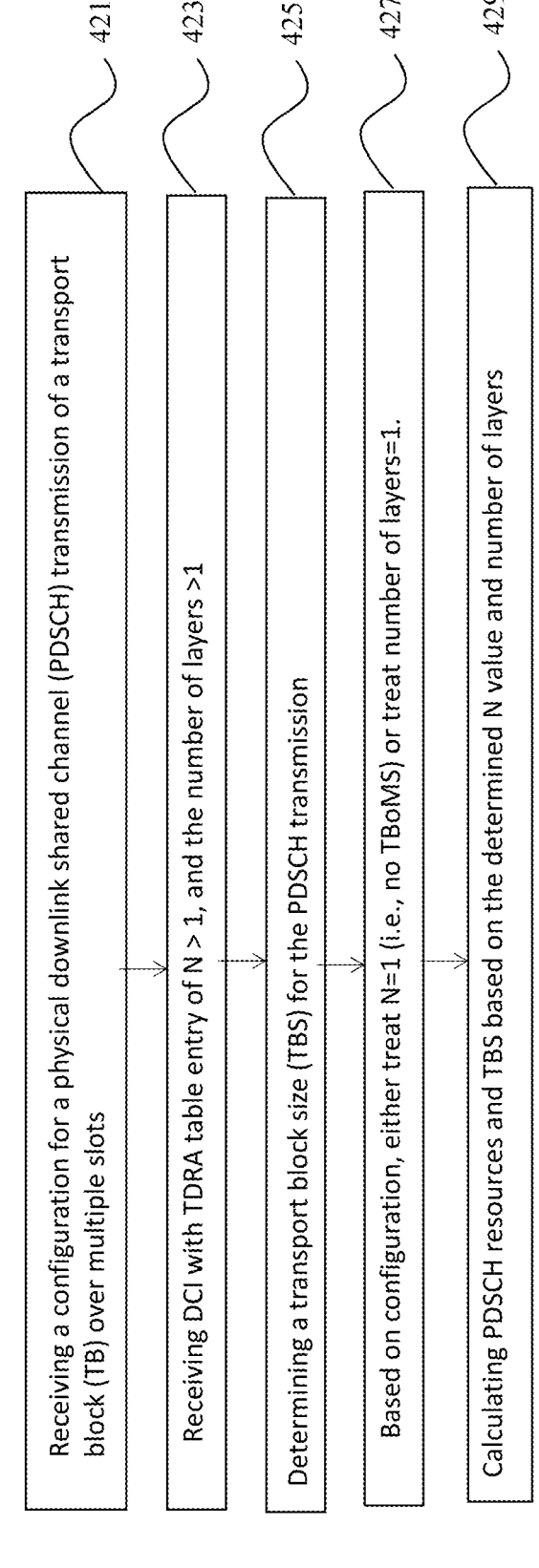

421 — Receiving a configuration for a physical downlink shared channel (PDSCH) transmission of a transport block (TB) over multiple slots 423 — Receiving DCI with TDRA table entry of N > 1, and the number of layers >1

425 — Determining a transport block size (TBS) for the PDSCH transmission

427 — Based on configuration, either treat N=1 (i.e., no TBoMS) or treat number of layers=1.

429 — Calculating PDSCH resources and TBS based on the determined N value and number of layers

TRANSPORT BLOCK OVER MULTIPLE SLOTS FOR DOWNLINK TRANSMISSIONS

CROSS-REFERENCE TO RELATED APPLICATIONS

The present application claims the benefit of U.S. Provisional Patent Application No. 63/334,922, filed on Apr. 26, 2022, which is hereby incorporated by reference in its entirety.

FIELD

The described aspects generally relate to a wireless communication system including transport blocks (TBs) over multiple slots (TBoMS) for downlink transmissions.

RELATED ART

A wireless communication system can include a fifth generation (5G) system, a New Radio (NR) system, a long term evolution (LTE) system, a non-terrestrial wireless network (NTN), a combination thereof, or some other wireless systems. In addition, a wireless communication system can support a wide range of use cases such as enhanced mobile broad band (eMBB), massive machine type communications (mMTC), ultra-reliable and low-latency communications (URLLC), enhanced vehicle to anything communications (eV2X), among others. Large propagation delays may become a problem for many wireless communication systems.

SUMMARY

Some aspects of this disclosure relate to apparatuses and methods for implementing techniques for a user equipment (UE) to receive physical downlink shared channel (PDSCH) transmissions of a transport block (TB) over multiple slots from a base station. PDSCH transmissions of a TB received over multiple slots can help to enhance the technology to overcome challenges in a wireless network having a large propagation delay. The implemented techniques can be applicable to many wireless systems, e.g., a wireless communication system based on 3rd Generation Partnership Project (3GPP) release 15 (Rel-15), release 16 (Rel-16), release 17 (Rel-17), non-terrestrial wireless networks (NTN), or other wireless networks.

Some aspects of this disclosure relate to a UE. The UE can include a transceiver configured to enable wireless communication with a base station, and a processor communicatively coupled to the transceiver. The processor can be configured to receive a configuration for a PDSCH transmission of a TB over multiple slots (TBoMS), such as a first number of slots, through a downlink from a base station. The configuration can include an indication of the first number of slots. In some embodiments, the downlink from the base station may include a link from a satellite to the UE. In some embodiments, the configuration can include a time-domain resource allocation (TDRA) table having an indication of the first number of slots for the PDSCH transmission. In some embodiments, the configuration for the PDSCH transmission of the TB over the first number of slots can further include an indication to repeat a second time the PDSCH transmission of the TB over the first number of slots. In some embodiments, the processor is configured to receive a downlink control information (DCI) that schedules the PDSCH transmission over the downlink from the base station.

According to some aspects, the processor can be further configured to determine a transport block size (TBS) for the PDSCH transmission, and allocate a second number of slots used by the UE to support the PDSCH transmission such as allocating the second number of slots based on available slots for the UE. Based on the TBS for the PDSCH transmission satisfying a condition, the processor can be configured to receive the PDSCH transmission of the TB over the second number of slots, decode the PDSCH transmission received over the second number of slots to obtain the TB, and send a feedback to the base station based on the decoded PDSCH transmission.

In some embodiments, the processor can be configured to receive an indication from the base station to enable the UE for receiving the PDSCH transmission of the TB over the second number of slots, where the indication is included in a DCI or in a time-domain resource allocation (TDRA) table. In some embodiments, the processor can be configured to determine the TBS for the PDSCH transmission satisfies the condition based on the TBS being less than a predetermined size for a single code block or less than a predetermined number of bits. In some embodiments, the downlink from the base station can include a link from a satellite to the UE, and the processor can be configured to determine an indication to start the receiving the PDSCH transmission of the TB over the second number of slots based on a distance between the UE and the satellite is greater than a threshold distance. In some embodiments, the second number of slots can include a first slot and a second slot, where the first slot can include a number of resource elements for the PDSCH transmission, and the second slot can include the same number of resource elements for the PDSCH transmission.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 2 illustrates a block diagram of a UE including a transceiver and a processor, according to some aspects of the disclosure.

FIG. 3 illustrates an example process performed by a UE for receiving PDSCH transmissions of a TB over multiple slots, according to some aspects of the disclosure.

FIGS. 4A-4C illustrate example processes performed by a UE for receiving PDSCH transmissions of a TB over multiple slots, according to some aspects of the disclosure.

Figure 1:
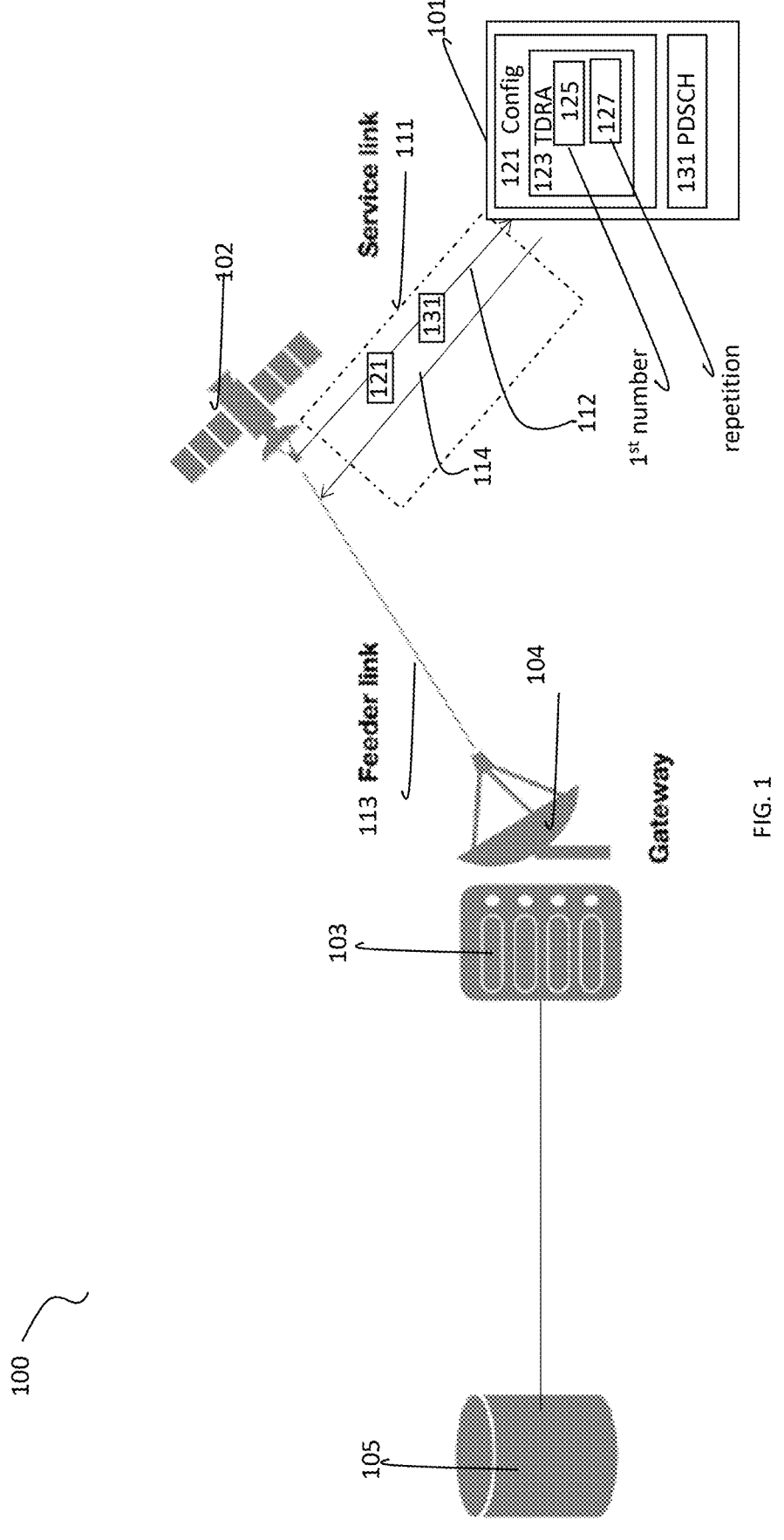
FIG. 1 illustrates a non-terrestrial wireless network (NTN) including a user equipment (UE) to receive physical downlink shared channel (PDSCH) transmissions of a transport block (TB) over multiple slots, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

With the development of mobile communication networks, for various reasons, some wireless systems, such as fifth-generation (5G) networks or non-terrestrial wireless networks, may have large propagation delay, higher propagation loss, weaker diffraction capability, and limited and shortened coverage. Non-terrestrial wireless networks (NTN) can refer to any network that involves non-terrestrial flying objects. An NTN can include a satellite communication network, a high altitude platform systems (HAPS), an air-to-ground network, a low-altitude unmanned aerial vehicles (UAVs, aka. drones), or any other NTN. Coverage enhancement technology may be needed to address the challenges in NTN or other similar networks with large propagation delay or other problems.

In a conventional wireless system, uplink (UL) or downlink (DL) transmissions may be designed for a slot, which may be a dynamic scheduling unit or otherwise defined time duration by a communication standard. There is usually no consistency requirement or coordination in different multiple slots. One coverage enhancement technology to address the challenges due to the large propagation delay may coordinate over multiple slots for UL or DL transmissions, such as physical downlink shared channel (PDSCH) transmissions of a transport block (TB) over multiple slots (TBoMS). A transport block may be a packet of data which is passed between the medium access control (MAC) and physical layers. A TB may be passed downwards at the transmitter and upwards at the receiver. A TB can undergo physical layer processing at the transmitter before being mapped onto PDSCH transmissions for transfer across the air-interface. The UE receiving data on the PDSCH transmissions may determine the transport block size (TBS) before attempting to decode the data.

Some aspects of this disclosure provide mechanisms for a UE to receive PDSCH transmissions of a TB over multiple slots.

FIG. 1 illustrates an NTN 100 including a UE 101 to receive PDSCH transmissions of a TB over multiple slots, according to some aspects of the disclosure. NTN 100 is provided for the purpose of illustration only and does not limit the disclosed aspects. Techniques described herein for NTN 100 can also be applicable to other wireless systems without a satellite when PDSCH transmissions of a TB are received over multiple slots.

NTN 100 can include, but is not limited to, UE 101, a base station 103, a satellite 102, a gateway 104, and a core network 105. UE 101 communicates with satellite 102 through a service link 111, and satellite 102 communicates with gateway 104 through a feeder link 113. Service link 111 can include a downlink 112 and an uplink 114. Satellite 102 can include a network node or a transceiver for wireless communication. There can be various implementations of NTN 100. For example, base station 103 and gateway 104 may be integrated into one unit instead of being separated components. Base station 103 and core network 105 may implement functions as a normal terrestrial wireless network without a satellite, while gateway 104 may implementation functions between a terrestrial wireless network and satellite 102.

In some embodiments, NTN 100 can have a transparent payload, where base station 103 is located on the ground. In some embodiments, NTN 100 can have a regenerative payload when base station 103 can be located on satellite 102. There can be multiple satellites with onboard base stations communicating with each other. There can be other network entities, e.g., network controller, a relay station, not shown. AN NTN can be referred to as a wireless network, a wireless communication system, or some other names known to a person having ordinary skill in the art.

In some embodiments, NTN 100 can be an NTN having a non-terrestrial flying object, e.g., satellite 102. In some embodiments, NTN 100 can include a satellite communication network that includes satellite 102, a HAPS, or an air-to-ground network, or a UAV. There can be multiple satellites in NTN 100. Satellite 102 can be a low Earth orbiting (LEO) satellite, a medium Earth orbiting (MEO) satellite, or a geosynchronous (GSO) Earth orbiting (GEO) satellite. NTN 100 can be a HAPS, which can be an airborne platform including airplanes, balloons, and airships. For example, NTN 100 can include the International Mobile Telecommunications base stations, known as HIBS. A HIBS system can provides mobile service in the same transmission frequency used by terrestrial mobile networks. NTN 100 can be an air-to-ground network to provide in-flight connectivity for airplanes by utilizing ground stations which play a similar role as base stations in terrestrial mobile networks. NTN 100 can also be a mobile enabled low-altitude UAVs.

In some embodiments, satellite 102 can be a GEO satellite deployed at an altitude of 35786 Km and is characterized by a slow motion around its orbital position with respect to a point on the Earth. Compared to terrestrial cellular systems, communication networks based on a GEO satellite have a large propagation delay that has to be taken into account in the overall design of the satellite network and high propagation losses. Additionally and alternatively, satellite 102 can be a LEO satellite at an altitude of 300-3000 km. In some embodiments, satellite 102 can communicate with UE 101 over various bands, such as 1610-1618.725 MHz UL (L-band) and 2483.5-2500 MHz DL (S-band). There can be power flux density (PFD) limitation on S-band. For example, for S-band 2483.5-2500 MHz DL for mobile-satellite services, a GSO satellite 102 can have a PFD: P=−146 dB (W/m$^2$) in 4 kHz and −128 dB (W/m$^2$) in 1 MHz, with r=0.5. In addition, a non-GSO satellite 102 can have a PFD: P=−144 dB (W/m$^2$) in 4 kHz and −126 dB (W/m$^2$) in 1 MHz, with r=0.65.

According to some aspects, base station 103 can be a fixed station or a mobile station. In some embodiments, base station 103 can be located onboard satellite 102. Base station 103 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, UE 101 can be stationary or mobile. UE 101 can be a handheld terminal or a very small aperture terminal (VSAT) that is equipped with parabolic antennas and typically mounted on buildings or vehicles. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 101 can be implemented according to a block diagram as illustrated in FIG. 2. Referring to FIG. 2, UE 101 can have antenna panel 217 including one or more antenna elements to form various transmission beams, e.g., transmission beam 213, coupled to a transceiver 203 and controlled by a processor 209. Transceiver 203 and antenna panel 217 (using transmission beam 213) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203. Various data can be stored in memory 201.

In some embodiments, memory 201 can store a configuration 121 for a PDSCH transmission 131 of a TB over multiple slots (TBoMS), such as a first number of slots, received through downlink 112 from satellite 102, which is also a part of a downlink from base station 103 to UE 101. Configuration 121 can include an indication of a first number of slots for the PDSCH transmission. In some embodiments, configuration 121 can include a time-domain resource allocation (TDRA) table 123 having an indication 125 of the first number of slots for the PDSCH transmission. The first number of slots can be larger than 1, which means there are multiple slots used in the PDSCH transmission for the TB. Configuration 121 can further include an indication 127 to repeat a second time PDSCH transmission 131 of the TB over the first number of slots.

In some embodiments, memory 201 can store a transport block size (TBS) 221 for the PDSCH transmission 131, which can be determined by processor 209. Processor 209 can further determine a second number of slots 223 used by UE 101 to support the PDSCH transmission. Memory 201 can further store a condition 225, which can be a condition to compare with a predetermined size for a single code block or a predetermined number of bits. Based on TBS 221 for PDSCH transmission 131 satisfying condition 225, and the second number of slots 223 being larger than 1, processor 209 can receive the PDSCH transmission 131 of the TB over the second number of slots 223. The second number of slots 223 may be determined based on available slots for UE 101.

In some embodiments, a slot can be used as a dynamic scheduling unit. Additionally, some wireless system may support transmission based on mini-slot (a fraction of a slot) as a minimum scheduling unit. The number of OFDM symbols per slot can be fixed, such as 14 with normal cyclic prefix (CP) and 12 with extended CP. In LTE, the number of slots per subframe can be fixed at 2. In NR, the number of slots per subframe varies with numerology (increasing with subcarrier spacing). In some embodiments, a slot can have a length or duration as 0.5 ms, while some subframe can have a length or duration as 1 ms. A slot can be classified as downlink (all symbols are dedicated for downlink) or uplink (all symbols are dedicated for uplink) or mixed uplink and downlink transmissions.

In some embodiments, memory 201 can include instructions, that when executed by the processor 209 perform operations described herein, e.g., operations described in process 300 in FIG. 3 by a UE for receiving PDSCH transmissions of a TB over multiple slots. Alternatively, processor 209 can be "hard-coded" to receive PDSCH transmissions of a TB over multiple slots described herein.

FIG. 3 illustrates an example process 300 performed by a UE for receiving PDSCH transmissions of a TB over multiple slots, according to some aspects of the disclosure. According to some aspects, as shown in FIG. 3, process 300 can be performed by UE 101.

At 301, UE 101 can receive a configuration for a PDSCH transmission of a TB over a first number of slots through a downlink from a base station, where the configuration can include an indication of the first number of slots that is larger than 1. For example, as shown in FIGS. 1-2, UE 101 can receive configuration 121 for PDSCH transmission 131 over multiple slots through a downlink from base station 103. Configuration 121 can include the indication 125 of the first number of slots for the PDSCH transmission, which can be included in TDRA table 123. In some embodiments, UE 101 can receive a DCI that schedules PDSCH transmission 131 over the downlink from the base station.

At 303, UE 101 can determine a TBS for the PDSCH transmission. For example, as shown in FIGS. 1-2, UE 101 can determine TBS 221 for PDSCH transmission 131.

At 305, UE 101 can determine a second number of slots used by the UE to support the PDSCH transmission. For example, as shown in FIGS. 1-2, UE 101 can determine the second number of slots 223 used by UE 101 to support the PDSCH transmission 131. The second number of slots 223 can be smaller than the first number of slots indicated by configuration 121. The second number of slots 223 can be determined based on available slots for the UE.

At 307, based on the TBS for the PDSCH transmission satisfying a condition, UE 101 can receive the PDSCH transmission of the TB over the second number of slots. For example, as shown in FIGS. 1-2, based on TBS 221 for the PDSCH transmission satisfying condition 225, UE 101 can receive the PDSCH transmission 131 of the TB over the second number of slots 223.

At 308, UE 101 can decode the PDSCH transmission received over the second number of slots to obtain the TB. For example, as shown in FIGS. 1-2, UE 101 can decode the PDSCH transmission 131 received over the second number of slots 223 to obtain the TB.

At 309, UE 101 can send a feedback to the base station based on the decoded PDSCH transmission. For example, as shown in FIGS. 1-2, UE 101 send a feedback to the base station based on the decoded PDSCH transmission.

There can be other operations performed by UE 101. In some embodiments, UE 101 can receive an indication from base station 103 to enable UE 101 for receiving PDSCH transmission 131 of the TB over the second number of slots 223, where the indication is included in a DCI or in a TDRA table. In some embodiments, UE 101 can determine TBS 221 for PDSCH transmission 131 satisfies the condition 225 based on the TBS 221 being less than a predetermined size for a single code block or less than a predetermined number of bits. In some embodiments, the downlink from base station 103 to UE 101 can include a link from satellite 102 to UE 101, and UE 101 can determine an indication to start the receiving PDSCH transmission 131 of the TB over the second number of slots 223 based on a distance between UE 101 and satellite 102 being greater than a threshold distance. In some embodiments, the second number of slots 223 can include a first slot and a second slot, where the first slot can include a number of resource elements for the PDSCH transmission, and the second slot can include the same number of resource elements for the PDSCH transmission.

Figure 4A:
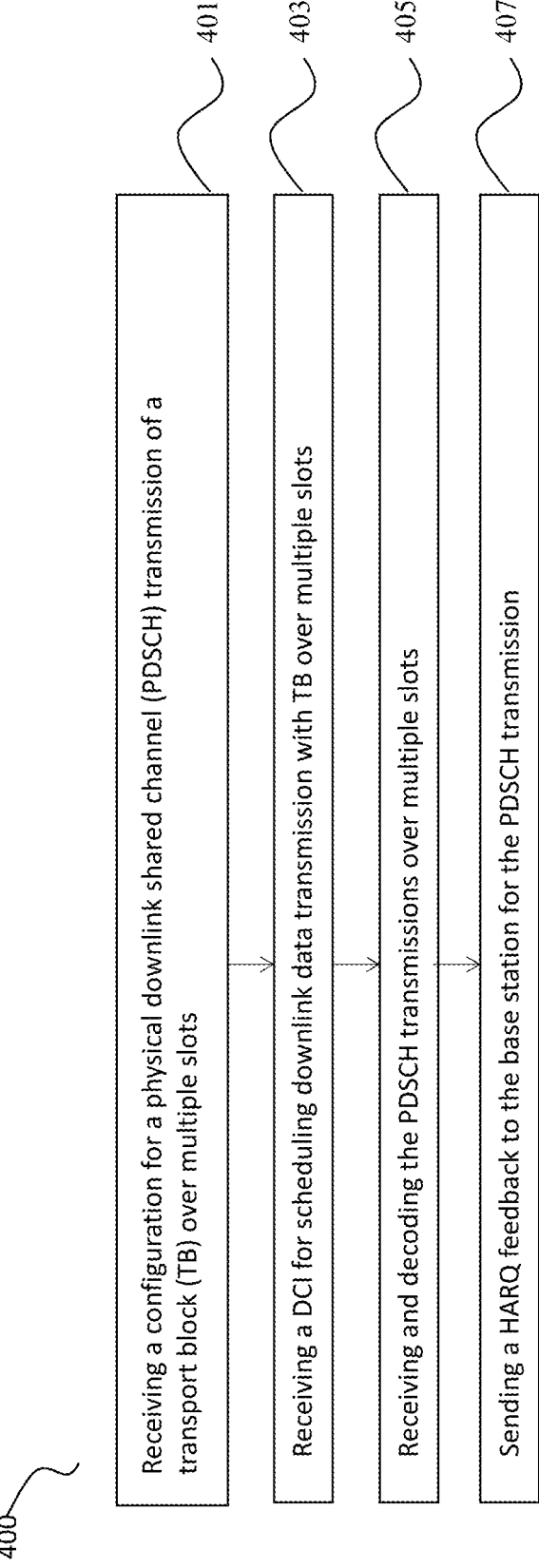

FIGS. 4A-4C illustrate example processes, e.g., process 400, process 410, and process 420, performed by a UE for receiving PDSCH transmissions of a TB over multiple slots, according to some aspects of the disclosure. Process 400, process 410, and process 420 can be examples of process 300, illustrated with more, less, or different details.

Process 400 is shown in FIG. 4A as a generic process, without showing a testing of the satisfying the condition, or a determination of the second number of slots as shown in FIG. 3, step 305 and step 307.

At 401, UE 101 can receive a configuration for a PDSCH transmission of a TB over multiple slots. The configuration can be a TDRA table that includes the number of slots (N) for a single TB transmission, such as Table 1 shown below, where N can be a value such as {2, 4, 8}. The TDRA table can also include a number of repetitions (M) for the PDSCH transmission, where M can be M<=16. In some embodiment, M can be configured and used independently from N. In some embodiments, there can be some limitations on the numbers N and M, such as M*N<=32. Base station 103 can modify the information element for the PDSCH, such as PDSCH-TimeDomainResourceAllocation to indicate such TDRA table.

Table 1

| TDRA index | K0 | Mapping type | Start symbol | Repetition number (M) | Number of slots for TBoMS (N) |
|---|---|---|---|---|---|
| 0 | | | | 4 | 4 |
| 1 | | | | 4 | 2 |
| 2 | | | | 2 | 8 |

At 403, UE 101 can receive a DCI for scheduling downlink data transmission with TB over multiple slots (TBoMS). The TDRA table entry can indicate N>1 slots allocated for TBoMS, which can be applicable to both dynamic grant PDSCH and semi persistent scheduling (SPS) PDSCH.

At 405, UE 101 can receive and decode PDSCH transmissions over multiple slots, where the multiple slots can be indicated by the TDRA table. Accordingly, it is implied that UE 101 can support the number of multiple slots indicated by the TDRA table. UE 101 can perform rate matching by concatenating the bits within a single repetition. UE 101 can also perform rate matching based on the redundancy version (RV) sequence within multiple repetitions.

In some embodiments, the available number of resource elements (REs) for the PDSCH transmissions can be different across multiple slots. In some embodiments, at resource block (RB) level, a RB can overlap with "reserved resources", such as Synchronization Signal block (SSB) and CORESET. Rate matching may be performed accordingly to RB or SSB patterns based on SSB periodicity, and rate matching around "reserved resources", SSB or CORESET. In some embodiments, at resource element (RE) level, a RE can overlap with channel state information reference signal (CSI-RS), and a PDSCH may be punctured by zero power (ZP)-CSI-RS.

In some embodiments, for rate matching purpose, the index of the starting coded bit for each slot of multiple slots for the PDSCH transmissions can be predetermined prior to the start of the TBoMS transmission. In some embodiments, a number (X) of rate matching output bits for the PDSCH transmissions can be the same across slots. The number X can be determined based on the first slot for TBoMS for the PDSCH transmissions. Additionally and alternatively, the number X can be determined based on the configured overhead deduction for TBoMS for the PDSCH transmissions. Some configured overhead (e.g., Y bits/RB) can be deducted when determining the value of X, while not checking the actual RB/RE level overlap with "reserved resources", SSB, CORESET, CSI-RS, etc. In some embodiments, the number X can be determined based on the slot with the smallest number of PDSCH resources. If the available number of REs for the PDSCH transmission in a slot is more than the number X, then the rate matching output bits for the slot is repeated. Therefore, the second number of slots includes a first slot and a second slot, where the first slot comprises a number of rate matching output bits for the PDSCH transmission, and the second slot comprises the same number of rate matching output bits for the PDSCH transmission. If the available number of REs for the PDSCH transmission in a slot is less than the number X, then the remaining rate matching output bits may not be transmitted in the slot. In some embodiments, the number of rate matching output bits for the PDSCH transmission may be different across different multiple slots. The number (X) of rate matching output bits for the PDSCH transmission can be determined by each slot for TBoMS, depending on the actual overlap with "reserved resources", SSB and CORESET. In addition, bit interleaving may be performed per TB, or per slot. In some embodiments, the index of the starting coded bits for each slot can be dynamically determined prior to the start of each TBoMS transmission slot, and bit interleaving can be performed per slot. In some embodiments, the TBoMS can be repeatedly transmitted. The number of repetitions of TBoMS may be bounded, e.g., by 16. In some embodiments, the number of repetitions of TBoMS is independently configured from the number of slots of each TBoMS. In some embodiments, the number of repetitions of TBoMS is upper bounded jointly with the number of slots of each TBoMS, e.g., the product of these two numbers is upper bounded by 32. In one embodiment, the redundancy version (RV) may be cycled across TBoMS repetitions. In another embodiment, the RV may be fixed across TBoMS repetitions.

At 407, UE 101 can send a hybrid automatic repeat request (HARQ) feedback for the PDSCH transmission. In some embodiments, K1 can be based on the last slot of the last PDSCH repetition. UE PDSCH processing procedure time $T'_{proc,1}$ for TBoMS can be different from legacy $T_{proc,1}$. This allows more processing time for combining and decoding under low signal to noise ratio (SNR). The processing time may depend on the number N slots for a single TBoMS, The larger N, the larger $T'_{proc,1}$.

Process 410 is shown in FIG. 4B, where process 410 can include triggering of TBoMS for PDSCH transmissions. In some embodiments, for a configuration provided by a base station for a PDSCH transmission of a TB over multiple slots, UE 101 may determine that the PDSCH transmission of a TB over multiple slots may not be enabled and reset it to transmit the PDSCH transmission over one slot only.

At 411, UE 101 can receive a configuration for a PDSCH transmission of a TB over multiple slots. The configuration can be a TDRA table includes the number of slots (N) for a single TB transmission, such as Table 1 shown above.

At 413, UE 101 can receive a DCI for scheduling downlink data transmission with TB over multiple slots. The TDRA table entry can indicate N>1 slots allocated for TBoMS. Such an entry N>1 can indicate that TBoMS for PDSCH transmissions is enabled. Otherwise, TBoMS can be disabled. In some embodiments, the DCI can indicate the TDRA table entry to implicitly enable the TBoMS. In some embodiments, if the TDRA table entries are not configured with "N", then the TBoMS is disabled. If TDRA table entries are configured with "N", DCI (e.g., formats 1_1, 1_2) may additionally indicate whether TBoMS is activated or not. An additional bit in DCI to indicate the activation of TBoMS. A code point of an existing DCI field (e.g., FDRA field) to indicate the activation of TBoMS. If enabled, then the value N in TDRA table is used. Otherwise, the value N in TDRA table is ignored.

At 415, UE 101 can calculate TBS based on the indicated N value to enable TBoMS. Even though the configuration may include the TDRA table having an entry N configured as larger than 1, which implies base station 103 configures UE 101 to perform TBoMS, UE 101 may still determine to disable TBoMS. TBoMS may be applied only when the transmission is limited to one codeblock (CB) only.

At 417, if the TDRA table entry has N>1, but the calculated TBS and indicated Modulation Coding Scheme (MCS) implies multiple CB transmissions, then the configuration of N>1 may be an error case. UE 101 does not expect the calculated TBS exceeds the maximum TBS for single CB transmission in case TBoMS is used (i.e., N>1). In this case, UE 101 can ignore N value in the TDRA table entry, reset N=1, and re-calculates TBS using only one slot instead of multiple slots. In some embodiments, TBoMS may be applied only if the TBS (including TB CRC) is less than A bits (e.g., 3840 bits). In some other embodiments, TBoMS may be applied only when LDPC base graph 2 is used.

In some embodiments, triggering of TBoMS for PDSCH transmissions can be performed in various ways. In some embodiments, a base station can trigger the TBoMS based on the UE-specific Koffset value. When Koffset value is larger than a threshold, the base station triggers the TBoMS for PDSCH. In some embodiments, UE can trigger the TBoMS based on UE-specific time advance (TA) or full TA. When UE-specific TA or full TA is larger than a threshold, UE can request the base station to trigger the TBoMS for PDSCH. Triggering can be performed via the MAC CE or RRC signaling.

Process 420 is shown in FIG. 4C, where process 420 can include allocating a second number of slots used by the UE to support the PDSCH transmission where the second number of slots can be different from a first number of slots to support a PDSCH transmission of a TB over multiple slots based on the configuration.

At 421, UE 101 can receive a configuration for a PDSCH transmission of a TB over multiple slots. The configuration can be a TDRA table includes the first number of slots (N) for a single TB transmission, such as Table 1 shown above.

At 423, UE 101 can receive a DCI for scheduling downlink data transmission with TB over multiple slots. The TDRA table entry can indicate N>1 slots allocated for TBoMS. In addition, the configuration can further indicate the number of layers is larger than 1.

At 425, UE 101 can determine a TBS for the PDSCH transmission. In some embodiments, the TBS can be determined based on multiple slots:

$$N'_{RE} = N^{RB}_{SC} N^{sh}_{symbol} - N^{PRB}_{DMRS} - N^{PRB}_{oh};$$

$$N_{RE} = N * \min(156, N'_{RE}) * n_{PRB};$$

$$N_{info} = N_{RE} * R * Q_m * v$$

In some embodiments when frequency-domain response allocation (FDRA) is used, a same number of PRBs per symbol may be allocated across slots for TBoMS. In some embodiments when TDRA is used, the number of slots allocated for a single TBoMS can be determined in various way, such as based on the available slots for DL transmissions. The available slot can be determined in two steps: determining the TDRA in the DCI and RRC configurations such as TDD UL/DL configurations, and then determining whether the DL slot is dropped according to Rel-15/16/17 dropping rule. If the slot is dropped but it is still counted in the repetition number. In some embodiments, the number of slots allocated for a single TBoMS can be determined as the physical slots after the initial DL slots, where the actual number of slots for TBoMS may be less than N that is the configured number of slots for TBoMS. Accordingly, $$N^{PRB}_{oh}$$

can be the same for all the slots, while $N_{info}$ is based on the number of REs determined in the first slot, then scale by the number of allocated slots.

At 427, UE 101 can determine the number of MIMO layers (rank) for TBoMS. In some embodiments, the number of MIMO layers (rank) for TBoMS is limited to 1. If the TDRA table entry has N>1, but the DCI indicated number of layers is larger than 1, then it is error case. Based on configuration, UE 101 can either treat N=1 (i.e., no TBoMS) or treat number of layers=1.

At 429, UE 101 can calculate PDSCH resources and TBS based on the determined N value and number of layers. In some embodiments, UE 101 can ignore N value in the TDRA table entry (or treat N=1), and re-calculates TBS. In some embodiments, UE 101 can treats the number of layers as 1, and re-calculates TBS. In some embodiments, UE 101 can select one way to perform either of the above two ways based on a configuration from base station 103.

Figure 5:
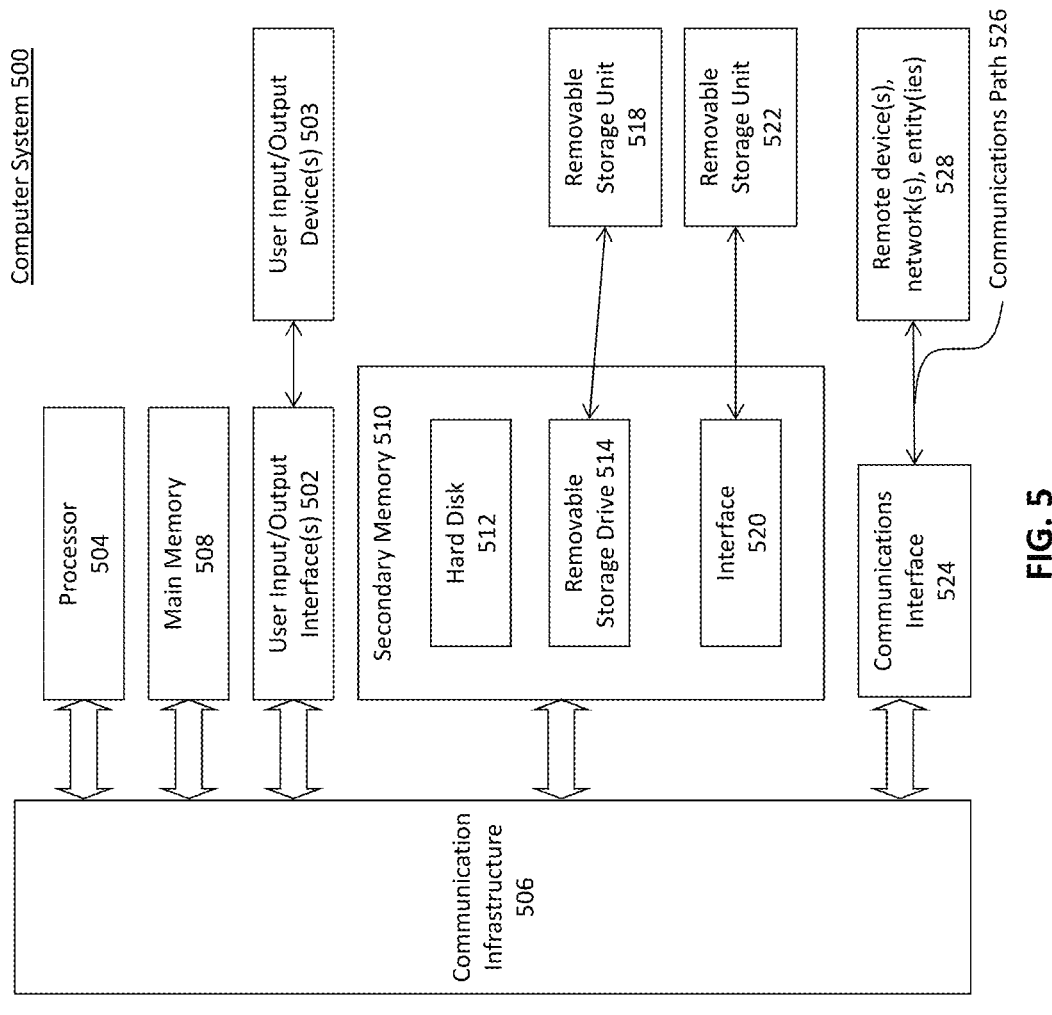
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 101, or base station 103 as shown in FIG. 1 and FIG. 2, for operations described for processor 209 or process 300, process 400, process 410, or process 420 as shown in FIGS. 3, 4A-4C. Computer system 500 includes one or more processors (also called central processing units, or CPUs), such as a processor 504. Processor 504 is connected to a communication infrastructure 506 (e.g., a bus). Computer system 500 also includes user input/output device (s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, or base station 103 as shown in FIG. 1 and FIG. 2. In some examples, the operations include those operations illustrated and described for process 300, process 400, process 410, or process 420 as shown in FIGS. 3, 4A-4C.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of performing wireless communication by a user equipment (UE), comprising:
   receiving a configuration for a physical downlink shared channel (PDSCH) transmission of a transport block (TB) over a first number of slots through a downlink from a base station, wherein the configuration includes an indication of the first number of slots;
   determining a transport block size (TBS) for the PDSCH transmission;
   determining a second number of slots used by the UE to support the PDSCH transmission;
   based on the TBS for the PDSCH transmission being less than a predetermined size for a single code block or less than a predetermined number of bits, receiving the PDSCH transmission of the TB over the second number of slots;
   decoding the PDSCH transmission received over the second number of slots to obtain the TB; and
   sending a feedback to the base station based on the decoded PDSCH transmission.

2. The method of claim 1, further comprising:
   receiving a downlink control information (DCI) that schedules the PDSCH transmission over the downlink from the base station.

3. The method of claim 1, wherein the downlink from the base station includes a link from a satellite to the UE.

4. The method of claim 1, wherein the configuration includes a time-domain resource allocation (TDRA) table having an indication of the first number of slots for the PDSCH transmission.

5. The method of claim 1, further comprising:
   receiving an indication from the base station to enable the UE for receiving the PDSCH transmission of the TB over the second number of slots, wherein the indication is included in a downlink control information (DCI) or in a time-domain resource allocation (TDRA) table.

6. The method of claim 1, further comprising:
   determining the TBS for the PDSCH transmission satisfies a condition based on the TBS being less than the predetermined size for the single code block or less than the predetermined number of bits.

7. The method of claim 1, wherein the downlink from the base station includes a link from a satellite to the UE, and the method further comprises:
   determining an indication to start the receiving the PDSCH transmission of the TB over the second number of slots based on a distance between the UE and the satellite is greater than a threshold distance.

8. The method of claim 1, wherein the second number of slots includes a first slot and a second slot, wherein the first slot comprises a number of rate matching output bits for the PDSCH transmission, and the second slot comprises the same number of rate matching output bits for the PDSCH transmission.

9. The method of claim 1, wherein the configuration for the PDSCH transmission of the TB over the first number of slots further includes an indication to repeat a second time the PDSCH transmission of the TB over the first number of slots.

10. The method of claim 1, wherein allocating the second number of slots used by the UE to support the PDSCH transmission includes allocating the second number of slots based on available slots for the UE.

11. A user equipment (UE), comprising:
   a transceiver configured to enable wireless communication over a wireless network with a base station; and
   a processor communicatively coupled to the transceiver and configured to:
      receive a configuration for a physical downlink shared channel (PDSCH) transmission of a transport block (TB) over a first number of slots through a downlink from the base station, wherein the configuration includes an indication of the first number of slots;
      determine a transport block size (TBS) for the PDSCH transmission;
      allocate a second number of slots used by the UE to support the PDSCH transmission;
      based on the TBS for the PDSCH transmission being less than a predetermined size for a single code block or less than a predetermined number of bits, receive the PDSCH transmission of the TB over the second number of slots;
      decode the PDSCH transmission received over the second number of slots to obtain the TB; and
      send a feedback to the base station based on the decoded PDSCH transmission.

12. The UE of claim 11, wherein the processor is further configured to:
   receive a downlink control information (DCI) that schedules the PDSCH transmission over the downlink from the base station.

13. The UE of claim 11, wherein the downlink from the base station includes a link from a satellite to the UE.

14. The UE of claim 11, wherein the configuration includes a time-domain resource allocation (TDRA) table having an indication of the first number of slots for the PDSCH transmission.

15. The UE of claim 11, wherein the processor is further configured to:

receive an indication from the base station to enable the UE for receiving the PDSCH transmission of the TB over the second number of slots, wherein the indication is included in a DCI or in a time-domain resource allocation (TDRA) table.

16. The UE of claim 11, wherein the second number of slots includes a first slot and a second slot, wherein the first slot comprises a number of rate matching output bits for the PDSCH transmission, and the second slot comprises the same number of rate matching output bits for the PDSCH transmission.

17. The UE of claim 11, wherein the configuration for the PDSCH transmission of the TB over the first number of slots further includes an indication to repeat a second time the PDSCH transmission of the TB over the first number of slots.

18. The UE of claim 11, wherein the allocating the second number of slots used by the UE to support the PDSCH transmission includes allocating the second number of slots based on available slots for the UE.

19. A non-transitory computer-readable medium storing instructions that, when executed by a processor of a user equipment (UE), cause the UE to perform operations, the operations comprising:

receiving a configuration for a physical downlink shared channel (PDSCH) transmission of a transport block (TB) over a first number of slots through a downlink from a base station, wherein the configuration includes an indication of the first number of slots;

determining a transport block size (TBS) for the PDSCH transmission;

allocating a second number of slots used by the UE to support the PDSCH transmission;

based on the TBS for the PDSCH transmission being less than a predetermined size for a single code block or less than a predetermined number of bits, receiving the PDSCH transmission of the TB over the second number of slots;

decoding the PDSCH transmission received over the second number of slots to obtain the TB; and sending a feedback to the base station based on the decoded PDSCH transmission.

20. The non-transitory computer-readable medium of claim 19, wherein the configuration includes a time-domain resource allocation (TDRA) table having an indication of the first number of slots for the PDSCH transmission.

\* \* \* \* \*